(12) United States Patent
Lee et al.

(10) Patent No.: US 12,455,117 B2
(45) Date of Patent: Oct. 28, 2025

(54) FLUID SUPPLY SYSTEM

(71) Applicant: Samsung Electronics Co., Ltd., Suwon-si (KR)

(72) Inventors: Younhaeng Lee, Incheon (KR); Gwangwon Son, Hwaseong-si (KR); Jieun Jang, Pyeongtaek-si (KR); Wuyoung Choi, Hwaseong-si (KR); Eunhye Park, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

(21) Appl. No.: 18/090,094

(22) Filed: Dec. 28, 2022

(65) Prior Publication Data
US 2023/0266066 A1 Aug. 24, 2023

(30) Foreign Application Priority Data
Feb. 21, 2022 (KR) ........................ 10-2022-0022461

(51) Int. Cl.
*F28D 7/08* (2006.01)
*B08B 3/10* (2006.01)
*B08B 13/00* (2006.01)

(52) U.S. Cl.
CPC ................ *F28D 7/082* (2013.01); *B08B 3/10* (2013.01); *B08B 13/00* (2013.01); *B08B 2203/007* (2013.01)

(58) Field of Classification Search
CPC ..... B08B 3/10; B08B 13/00; B08B 2203/007; F28D 7/082; H01L 21/67017; H01L 21/67109; H01L 21/67253
See application file for complete search history.

(56) References Cited

U.S. PATENT DOCUMENTS 2,847,166 A * 8/1958 Smith .............. G05D 23/27537
165/289
3,522,909 A * 8/1970 Perry ...................... F24H 1/165
126/362.1
(Continued)

FOREIGN PATENT DOCUMENTS

EP 3875877 A1 * 9/2021 .............. B22F 10/00
JP S59117999 A 7/1984
(Continued)

OTHER PUBLICATIONS

First Office Action dated Jul. 11, 2024 for corresponding TW Patent Application No. 111144497.

*Primary Examiner* — Ljiljana V. Ciric
(74) *Attorney, Agent, or Firm* — Muir Patent Law, PLLC

(57) ABSTRACT

A fluid supply includes a first fluid source configured to supply a first fluid, a second fluid source configured to supply a second fluid, a heat exchanger configured to exchange heat between the first fluid and the second fluid, a first fluid recovery tank operably connected to the heat exchanger to recover the first fluid that has passed through the heat exchanger, and a first transfer pipe configured to transfer the first fluid from the first fluid source to the first fluid recovery tank via the heat exchanger. A first fluid moving tube of the heat exchanger includes a first fluid inlet through which the first fluid is injected and a first fluid outlet through which the first fluid is discharged. The first fluid inlet is disposed at a level higher than the level of the first fluid outlet in the direction of gravity.

19 Claims, 8 Drawing Sheets

(56) References Cited

U.S. PATENT DOCUMENTS

| | | | | |
|---|---|---|---|---|
| 3,566,960 A * | 3/1971 | Stuart | H01J 37/34 | 165/104.31 |
| 3,759,217 A * | 9/1973 | Wiegmann | B27K 3/15 | 118/666 |
| 4,060,997 A * | 12/1977 | Shultz | G05D 23/1931 | 62/185 |
| 4,066,047 A * | 1/1978 | Vidakovic | F01P 5/04 | 165/125 |
| 4,129,177 A * | 12/1978 | Adcock | F24S 23/30 | 126/711 |
| 4,135,571 A * | 1/1979 | Tamblyn | F28D 20/0039 | 237/66 |
| 4,202,406 A * | 5/1980 | Avery | F24D 17/001 | 165/47 |
| 4,255,934 A * | 3/1981 | Stephenson | F01K 21/005 | 60/682 |
| 4,308,723 A * | 1/1982 | Ecker | F24D 11/0264 | 62/235.1 |
| 4,336,692 A * | 6/1982 | Ecker | F24D 11/0221 | 62/282 |
| 4,381,031 A * | 4/1983 | Whitaker | G05D 23/1919 | 165/47 |
| 4,495,777 A * | 1/1985 | Babington | F25D 17/02 | 165/300 |
| 4,745,690 A * | 5/1988 | Koop | B01D 3/00 | 34/340 |
| 4,911,228 A * | 3/1990 | Meshulam | F24D 17/0068 | 165/104.19 |
| 4,986,342 A * | 1/1991 | Meshulam | F24D 17/0068 | 165/104.19 |
| 5,123,478 A * | 6/1992 | Hosaka | H05K 7/20281 | 236/44 R |
| 5,348,076 A * | 9/1994 | Asakawa | H05K 7/20281 | 361/699 |
| 5,395,451 A * | 3/1995 | Triculis | B05B 9/0423 | 118/602 |
| 5,400,609 A * | 3/1995 | Sjoholm | F25B 49/022 | 62/200 |
| 5,435,379 A * | 7/1995 | Moslehi | F04B 49/24 | 250/442.11 |
| 5,816,181 A * | 10/1998 | Sherman, Jr. | B63B 57/00 | 114/125 |
| 6,001,215 A * | 12/1999 | Ban | H01L 21/67086 | 257/E21.25 |
| 6,182,742 B1 * | 2/2001 | Takahashi | H05K 7/20281 | 165/200 |
| 6,247,531 B1 * | 6/2001 | Cowans | F25B 41/34 | 165/206 |
| 6,253,121 B1 * | 6/2001 | Cline | H02H 5/105 | 361/115 |
| 6,299,774 B1 * | 10/2001 | Ainsworth | C12M 47/20 | 210/603 |
| 6,350,322 B1 * | 2/2002 | Yates | H01L 21/67057 | 134/28 |
| 6,371,157 B1 * | 4/2002 | See | H05K 7/20281 | 700/282 |
| 6,412,551 B1 * | 7/2002 | Tustaniwskyj | G05D 23/1393 | 165/300 |
| 6,554,196 B2 * | 4/2003 | Sasayama | F25D 17/02 | 236/78 D |
| 6,659,361 B2 * | 12/2003 | Sasayama | F25B 41/24 | 236/78 D |
| 6,943,325 B2 * | 9/2005 | Pittman | A61H 33/60 | 4/545 |
| 7,057,140 B2 * | 6/2006 | Pittman | H05B 3/26 | 392/485 |
| 7,249,628 B2 * | 7/2007 | Pillion | F28D 7/082 | 165/157 |
| 7,435,447 B2 * | 10/2008 | Parent | G01N 21/53 | 427/427.2 |
| 7,684,446 B2 * | 3/2010 | Mcloughlin | B01F 35/831 | 700/19 |
| 7,849,916 B2 * | 12/2010 | Atlas | G05D 23/1919 | 165/289 |
| 8,214,936 B2 * | 7/2012 | Thweatt, Jr. | F28D 7/0066 | 4/493 |
| 8,241,466 B2 | 8/2012 | Noro et al. | | |
| 8,516,837 B2 * | 8/2013 | Swarup | F25D 21/12 | 62/509 |
| 8,814,536 B2 * | 8/2014 | Laverdiere | F04B 13/00 | 222/282 |
| 9,501,072 B2 * | 11/2016 | Potucek | E04H 4/129 | |
| 10,138,149 B2 | 11/2018 | Yokoi et al. | | |
| 10,203,166 B2 * | 2/2019 | Gil | F28F 1/003 | |
| 11,602,075 B2 * | 3/2023 | Zhong | H05K 7/20236 | |
| 2001/0003347 A1 * | 6/2001 | Shimoda | F25D 17/02 | 236/13 |
| 2002/0029877 A1 * | 3/2002 | Cowans | F25D 17/02 | 165/206 |
| 2002/0092357 A1 * | 7/2002 | Theriault | G01R 31/2862 | 73/760 |
| 2003/0077490 A1 * | 4/2003 | Reinke | F28D 9/0068 | 429/423 |
| 2004/0031278 A1 * | 2/2004 | Martin | F25B 40/02 | 62/201 |
| 2006/0042756 A1 | 3/2006 | Miyazaki et al. | | |
| 2007/0119816 A1 * | 5/2007 | Urquhart | H01L 21/6715 | 216/84 |
| 2009/0050174 A1 * | 2/2009 | Gheparde | B08B 7/0071 | 134/1 |
| 2010/0096110 A1 | 4/2010 | Neuber et al. | | |
| 2015/0128594 A1 * | 5/2015 | Soni | F28D 20/0034 | 60/641.15 |
| 2018/0366348 A1 | 12/2018 | Cho et al. | | |
| 2021/0057241 A1 | 2/2021 | Hashimoto et al. | | |
| 2021/0276087 A1 * | 9/2021 | Colson | F28F 1/003 | |
| 2021/0381783 A1 | 12/2021 | Matsumoto et al. | | |
| 2023/0266066 A1 * | 8/2023 | Lee | B08B 13/00 | 165/164 |

FOREIGN PATENT DOCUMENTS

| | | |
|---|---|---|
| JP | 2006066727 A | 3/2006 |
| JP | 2008055334 A | 3/2008 |
| KR | 100462897 B1 | 12/2004 |
| KR | 101558426 B1 | 10/2015 |
| KR | 1020170091367 A | 8/2017 |
| KR | 101842351 B1 * | 3/2018 |
| KR | 1020180135173 A | 12/2018 |
| KR | 102083264 B1 | 3/2020 |
| KR | 1020210020523 A | 2/2021 |

* cited by examiner

FLUID SUPPLY SYSTEM

CROSS-REFERENCE TO RELATED APPLICATION(S)

This application is based on and claims priority under 35 U.S.C. § 119 to Korean Patent Application No. 10-2022-0022461, filed on Feb. 21, 2022, in the Korean Intellectual Property Office, the disclosure of which is incorporated by reference herein in its entirety.

BACKGROUND

The inventive concept relates to a fluid supply system, and more particularly, to a fluid supply system heating a second fluid by using thermal energy of a first fluid.

In order to manufacture a semiconductor device, a multilayer thin film is formed on a semiconductor substrate or a display substrate, and etching and cleaning processes are indispensably adopted to form the thin film. In the etching and cleaning processes, a thin film, such as a nitride film, deposited on a rear surface of the substrate and particles act as impurities in a subsequent process. Impurities, such as an unnecessary thin film, on the rear surface of the substrate are removed using a substrate cleaning system. The cleaning process includes a chemical solution treatment process of etching or exfoliating contaminants on a semiconductor substrate by a chemical reaction, a rinsing process of cleaning a semiconductor wafer treated with a chemical solution with deionized water (DIW) by the chemical solution treatment process, and a drying process of drying the rinsed semiconductor wafer. To heat the DIW, several methods have been proposed.

SUMMARY

The inventive concept provides a fluid supply system using heat exchange.

According to an aspect of the inventive concept, there is provided a fluid supply system including a first fluid source configured to supply a first fluid; a second fluid source configured to supply a second fluid; a heat exchanger configured to exchange heat between the first fluid and the second fluid; a first fluid recovery tank configured to recover the first fluid that has passed through the heat exchanger; and a first transfer pipe configured to transfer the first fluid from the first fluid source to the first fluid recovery tank via the heat exchanger. The heat exchanger may be disposed at a vertical level higher than a vertical level of the first fluid recovery tank.

According to another aspect of the inventive concept, there is provided a fluid supply system including a first fluid source configured to supply a first fluid; a second fluid source configured to supply a second fluid; a heat exchanger configured to heat the second fluid, and exchange heat between the first fluid and the second fluid; a first fluid recovery tank configured to recover the first fluid that has passed through the heat exchanger; a first transfer pipe configured to transfer the first fluid from the first fluid source to the first fluid recovery tank via the heat exchanger; a first trap disposed between the heat exchanger and the first fluid recovery tank and including a first part extending downward in a, a second part extending in a horizontal direction, and a third part extending upward in a direction opposite to the direction of gravity; and a second trap disposed between the first trap and the first fluid recovery tank and configured to transfer the first fluid in a liquid state. The heat exchanger may be disposed at a vertical level higher than a vertical level of the first fluid recovery tank. The first to third parts of the first trap may be sequentially connected to each other. The first transfer pipe may include a first insertion transfer pipe disposed between the first fluid source and the heat exchanger, and a first discharge transfer pipe disposed between the heat exchanger and the first fluid recovery tank. The first discharge transfer pipe and the first and second traps may be configured to transfer the first fluid from the heat exchanger to the first fluid recovery tank.

According to another aspect of the inventive concept, there is provided a fluid supply system including a first fluid source configured to supply a first fluid; a second fluid source configured to supply g a second fluid; a heat exchanger configured to heat the second fluid, and exchange heat between the first fluid and the second fluid; a first fluid recovery tank configured to recover the first fluid that has passed through the heat exchanger; a second fluid recovery tank configured to recover the second fluid that has passed through the heat exchanger; a first transfer pipe configured to transfer the first fluid from the first fluid source to the first fluid recovery tank via the heat exchanger; a second transfer pipe configured to transfer the second fluid from the second fluid source to the second fluid recovery tank via the heat exchanger; a first trap disposed between the heat exchanger and the first fluid recovery tank and including a first part extending downward in a, a second part extending in a horizontal direction, and a third part extending upward in a direction opposite to the direction of gravity; a second trap disposed between the first trap and the first fluid recovery tank and configured to transfer the first fluid in a liquid state; and a bypass pipe disposed on the second trap and configured to transfer the first fluid from the first trap to the first fluid recovery tank. The heat exchanger may be disposed at a vertical level higher than a vertical level of the first fluid recovery tank. The first to third parts of the first trap may be sequentially connected to each other. The first transfer pipe may include a first insertion transfer pipe disposed between the first fluid source and the heat exchanger, and a first discharge transfer pipe disposed between the heat exchanger and the first fluid recovery tank. The first discharge transfer pipe and the first and second traps may be configured to transfer the first fluid from the heat exchanger to the first fluid recovery tank.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1A:
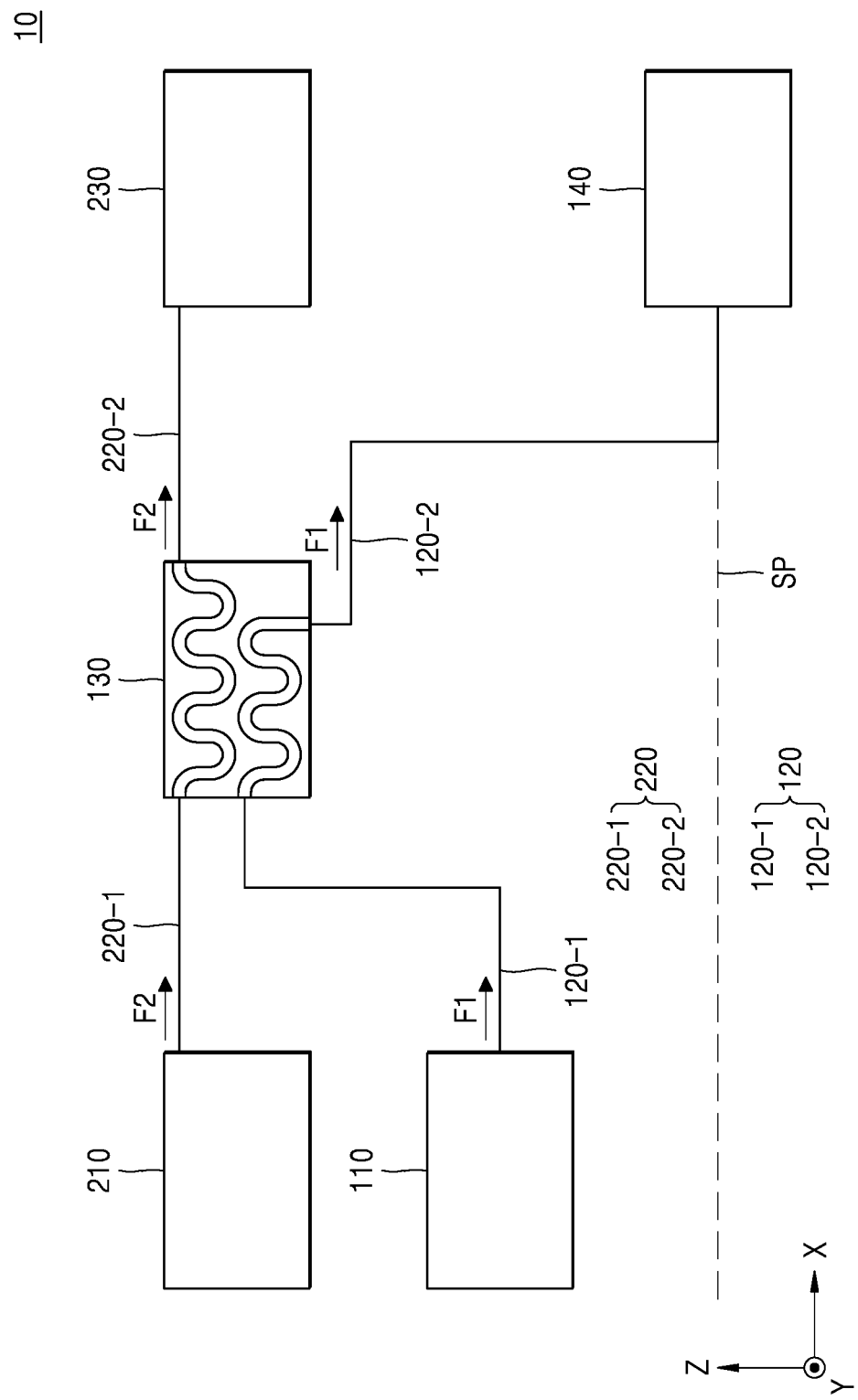
FIG. 1A is a diagram illustrating a configuration of a fluid supply system according to an embodiment of the inventive concept.

Hereinafter, embodiments of the inventive concept will be described in detail with reference to the accompanying drawings. The same reference numerals are used for the same components in the drawings, and redundant descriptions thereof are omitted.

Figure 1B:
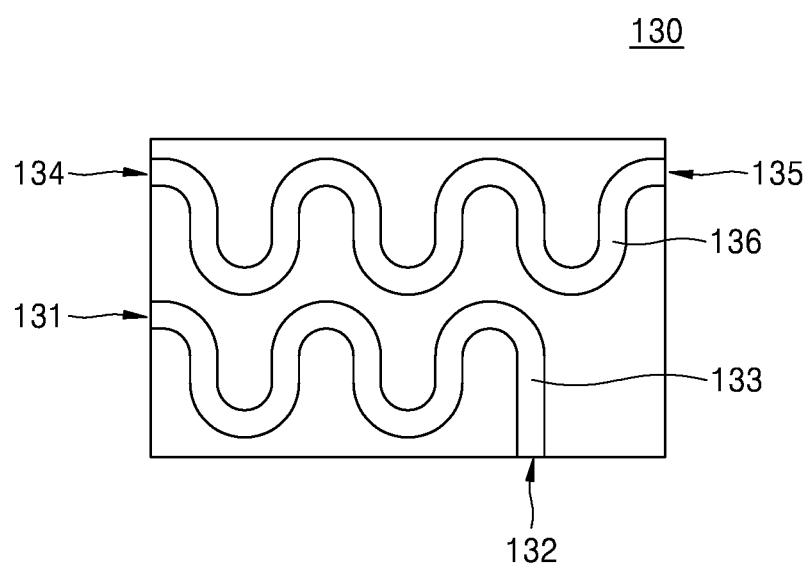
FIG. 1B is a diagram illustrating a configuration of a heat exchanger according to an embodiment of the inventive concept.

FIG. 1A is a diagram illustrating a configuration of a fluid supply system according to an embodiment of the inventive concept, and FIG. 1B is a diagram illustrating a configuration of a heat exchanger according to an embodiment of the inventive concept.

Referring to FIGS. 1A and 1B, a fluid supply system 10 is a system configured to control the temperature of a second fluid by using a first fluid, and may include a first fluid source 110, a first transfer pipe 120, the heat exchanger 130, a first fluid recovery tank 140, a second fluid source 210, a second transfer pipe 220, and a second fluid recovery tank 230. In FIG. 1A, F1 denotes a movement path of the first fluid, and F2 denotes a movement path of the second fluid.

The first fluid source 110 may include a first fluid storage tank (not shown) and a heater (not shown). The first fluid storage tank may have a shape suitable for storing the first fluid, for example, a container shape. For example, the first fluid stored in the first fluid storage tank may be stored in a liquid state. The heater may heat the first fluid stored in the first fluid storage tank. The heater may be provided, for example, inside the first fluid storage tank. In other embodiments, the heater may be mounted on a first insertion transfer pipe 120-1 of the first transfer pipe 120 and be configured to heat the first fluid flowing along the first insertion transfer pipe 120-1. The heater may include an induction heating-type heater, a resistance heating-type heater, etc. For example, the heater may include a coil using an induced electromotive force. In another embodiment, the heater may include a jacket-heater including a heating element therein. For example, the heater may vaporize the first fluid. For example, the first fluid may include distilled water.

The first fluid may be vaporized to be incident on the heat exchanger 130. When the first fluid is vaporized, the first fluid may have a relatively large amount of thermal energy, and thus, the second fluid may be effectively heated. To the contrary, when the first fluid is not vaporized, the first fluid may have relatively small thermal energy, which may not be sufficient to heat the second fluid.

The first transfer pipe 120 may be configured such that the first fluid may be transferred from the first fluid source 110 through the heat exchanger 130 to the first fluid recovery tank 140. The shape of the first transfer pipe 120 may also have a shape suitable for transferring the first fluid, for example, a cylindrical shape. The first transfer pipe 120 may include the first insertion transfer pipe 120-1 disposed between the heat exchangers 130 and the first fluid source 110, and a first discharge transfer pipe 120-2 disposed between the heat exchanger 130 and the first fluid recovery tank 140.

The heat exchanger 130 may be connected to the first fluid source 110 to receive the first fluid, and may be connected to the second fluid source 210 to receive the second fluid. Heat exchange may be performed between the first fluid and the second fluid provided in the heat exchanger 130. For example, the temperature of the second fluid may be increased by the thermal energy of the vaporized first fluid. According to an embodiment of the inventive concept, a range of the temperature of the second fluid before passing through the heat exchanger 130 may be about 10° C. to about 40° C., and a range of the temperature of the second fluid after passing through the heat exchanger 130 may be about 65° C. to about 85° C. The term such as "about" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0% to 5% deviation around 0.1 and a 0% to 5% deviation around 1, especially if such deviation maintains the same effect as the listed range.

The heat exchanger 130 may allow heat exchange between the first and second fluids. For example, the heat exchanger 130 may include a heater, a preheater, a condenser, an evaporator, etc. For example, the heat exchanger 130 may include a shell & tube heat exchanger, a block-type heat exchanger, a jacketed-type heat exchanger, an air cooled heat exchanger, a spiral-type heat exchanger, a plate heat exchanger, a welded heat exchanger, and/or a plate coil heat exchanger.

The heat exchanger 130 may include a first fluid inlet 131, a first fluid outlet 132, a first fluid moving tube 133, a second fluid inlet 134, a second fluid outlet 135, and a second fluid moving tube 136. The first fluid moving tube 133 and/or the second fluid moving tube 136 may have a repeating zigzag shape. Accordingly, a contact area between the first fluid and the second fluid may increase. Therefore, heat exchange between the first fluid moving inside the first fluid moving tube 133 and the second fluid moving inside the second fluid moving tube 136 may be more actively performed.

According to another embodiment, the first fluid moving tube 133 and/or the second fluid moving tube 136 may be formed in a spiral shape. In the first fluid moving tube 133 and/or the second fluid moving tube 136, a spiral is repeatedly formed, and thus, the contact area between the first fluid and the second fluid may increase.

Also, a vertical level of the first fluid inlet 131 may be higher than a vertical level of the first fluid outlet 132. Accordingly, the first fluid inside the heat exchanger 130 may be effectively transferred to the first fluid outlet 132.

The first fluid recovery tank 140 may recover the first fluid that has passed through the heat exchanger 130. The first fluid recovery tank 140 may have a shape suitable for recovering the first fluid, for example, a container shape. The first fluid may be liquefied immediately after passing through the heat exchanger 130 or between the heat exchanger 130 and the first fluid recovery tank 140 as the temperature of the first fluid is lowered. Accordingly, the first fluid recovered in the first fluid recovery tank 140 may be in a liquid state. A horizontal plane on which the first fluid recovery tank 140 is disposed may be defined as a standard plane SP.

In the present specification, a vertical direction (Z direction) may mean a direction in which gravity acts, and a horizontal direction (X direction and/or Y direction) may mean a direction perpendicular to the vertical direction (Z direction). Furthermore, the horizontal direction (X direction and/or Y direction) may mean a direction parallel to the standard plane SP.

The second fluid source 210 may store the second fluid. The second fluid source 210 may have a shape suitable for storing the second fluid, for example, a container shape. For example, the second fluid stored in the second fluid source 210 may be stored in a liquid state. For example, the second fluid may include deionized water (DIW) and/or ultrapure water (UPW). The second fluid may be used in a semiconductor process.

The second transfer pipe 220 may be configured such that the second fluid may be transferred from the second fluid source 210 to the second fluid recovery tank 230 through the heat exchanger 130. The shape of the second transfer pipe 220 may also have a shape suitable for transferring the second fluid, for example, a cylindrical shape. The second transfer pipe 220 may include a second insertion transfer pipe 220-1 disposed between the heat exchangers 130 and the second fluid source 210, and a second discharge insertion transfer pipe 220-2 disposed between the heat exchanger 130 and the second fluid recovery tank 230.

The second fluid recovery tank 230 may recover the second fluid that has passed through the heat exchanger 130. The second fluid recovery tank 230 may have a shape suitable for recovering the second fluid, for example, a container shape.

The heat exchanger 130 may be disposed at a higher vertical level than that of the first fluid recovery tank 140. For example, the first fluid that has passed through the heat exchanger 130 may be transferred to the first fluid recovery tank 140 by gravity. Accordingly, the first fluid may be effectively recovered.

A general fluid supply system includes a pump supplying power between a heat exchanger and a first fluid recovery tank to transfer a first fluid of the heat exchanger to the first fluid recovery tank. Therefore, in order to recover the first fluid, external power has to be supplied to the fluid supply system 10.

In example embodiments, in the fluid supply system 10, the heat exchanger 130 may be disposed at a vertical level higher than that of the first fluid recovery tank 140. Accordingly, the first fluid that has passed through the heat exchanger 130 may be transferred to the first fluid recovery tank 140 by gravity. For example, the first fluid may be transferred to the first fluid recovery tank 140 irrespective of supply of the external power.

The heated second fluid may be later transferred to a process chamber of a semiconductor facility. A cleaning process may be performed by using the second fluid. The cleaning process includes a chemical solution treatment process of etching or exfoliating contaminants on a semiconductor substrate by a chemical reaction, a rinsing process of cleaning a semiconductor wafer treated with a chemical solution with DIW by the chemical solution treatment process, and a drying process of drying the rinsed semiconductor wafer.

The semiconductor substrate may comprise a semiconductor wafer which may include a semiconductor base substrate and one or more layers (such as patterned conductive layers and patterned dielectric layers) to form circuitry on and/or within the wafer. The semiconductor substrate and/or semiconductor wafer may be being processed in a manufacturing method to produce semiconductor chips, such as memory chips, processor chips, communication IC's, etc. The semiconductor substrate/wafer may have just been subjected to a patterning process as part of steps to produce and/or connect integrated circuits within and/or on the substrate/wafer. For example, in a method of manufacturing an integrated circuit semiconductor chips, a layer may be formed on a substrate. The layer may be patterned (e.g., by forming a mask, e.g., by photolithography, and selectively etching the layer through the mask). The resulting structure including the patterned layer may then be cleaned, rinsed and dried.

Figure 2:
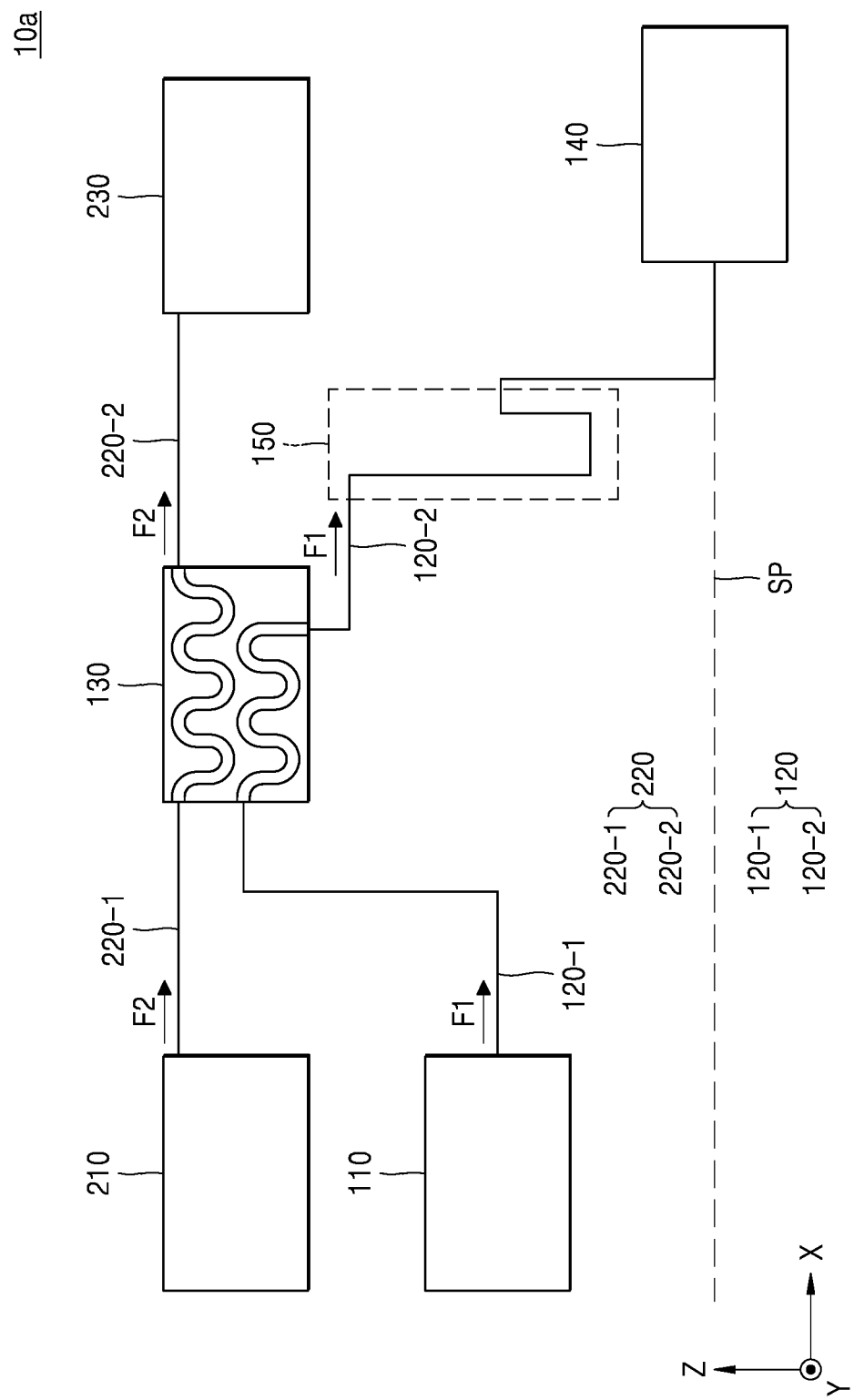
FIG. 2 is a diagram illustrating a configuration of a fluid supply system according to an embodiment of the inventive concept.

FIG. 2 is a diagram illustrating a configuration of a fluid supply system according to an embodiment of the inventive concept.

Referring to FIG. 2, a fluid supply system 10a may include the first fluid source 110, the first transfer pipe 120, the heat exchanger 130, the first fluid recovery tank 140, a first trap 150, the second fluid source 210, the second transfer pipe 220, and the second fluid recovery tank 230. The first fluid source 110, the first transfer pipe 120, the heat exchanger 130, the first fluid recovery tank 140, the second fluid source 210, the second transfer pipe 220, and the second fluid recovery tank 230 of FIG. 2 may be substantially the same as the first fluid source 110, the first transfer pipe 120, the heat exchanger 130, the first fluid recovery tank 140, the second fluid source 210, the second transfer pipe 220, and the second fluid recovery tank 230 of FIG. 1A, respectively. Therefore, the first trap 150 will be mainly described herein.

The first trap 150 may be configured to lower the temperature of the first fluid so that a first fluid is liquefied. The first trap 150 may be disposed between the heat exchanger 130 and the first fluid recovery tank 140, and may be connected on the first discharge transfer pipe 120-2 such that the liquefied first fluid may be transferred from the heat exchanger 130 to the first fluid recovery tank 140 through the first discharge transfer pipe 120-2 and the first trap 150. The first trap 150 may have a curved shape, so that the liquefied first fluid may be located below the first trap 150. The temperature of the first fluid passing through the first trap 150 may be reduced by the liquefied first fluid.

For example, the first trap 150 may be defined as a curved part of the first transfer pipe 120. For example, the first trap 150 may include a first part of the first transfer pipe 120 extending downward in a direction of gravity, a second part of the first transfer pipe 120 extending in a horizontal direction, and a third part of the first transfer pipe 120 extending upward in a direction opposite to the direction of gravity, wherein the first part, the second part, and the third part of the first transfer pipe 120 may be sequentially connected to each other in a moving direction of the first fluid.

The first trap 150 may be disposed between a vertical level of the heat exchanger 130 and a vertical level of the first fluid recovery tank 140. Accordingly, the first fluid discharged from the heat exchanger 130 may move to the first trap 150 through gravity, and the first fluid that has passed through the first trap 150 may move to the first fluid recovery tank 140.

In FIG. 2, the first trap 150 is illustrated as having a 'U' shape, but the shape of the first trap 150 is not limited thereto. For example, the first trap 150 may have a shape in which a lower end and an upper end having different vertical levels are located, and the first fluid may be stored in a liquid state at the upper end and/or the lower end. For example, the first trap 150 may have a shape of 'J', 'V' and/or 'W'.

Figure 3:
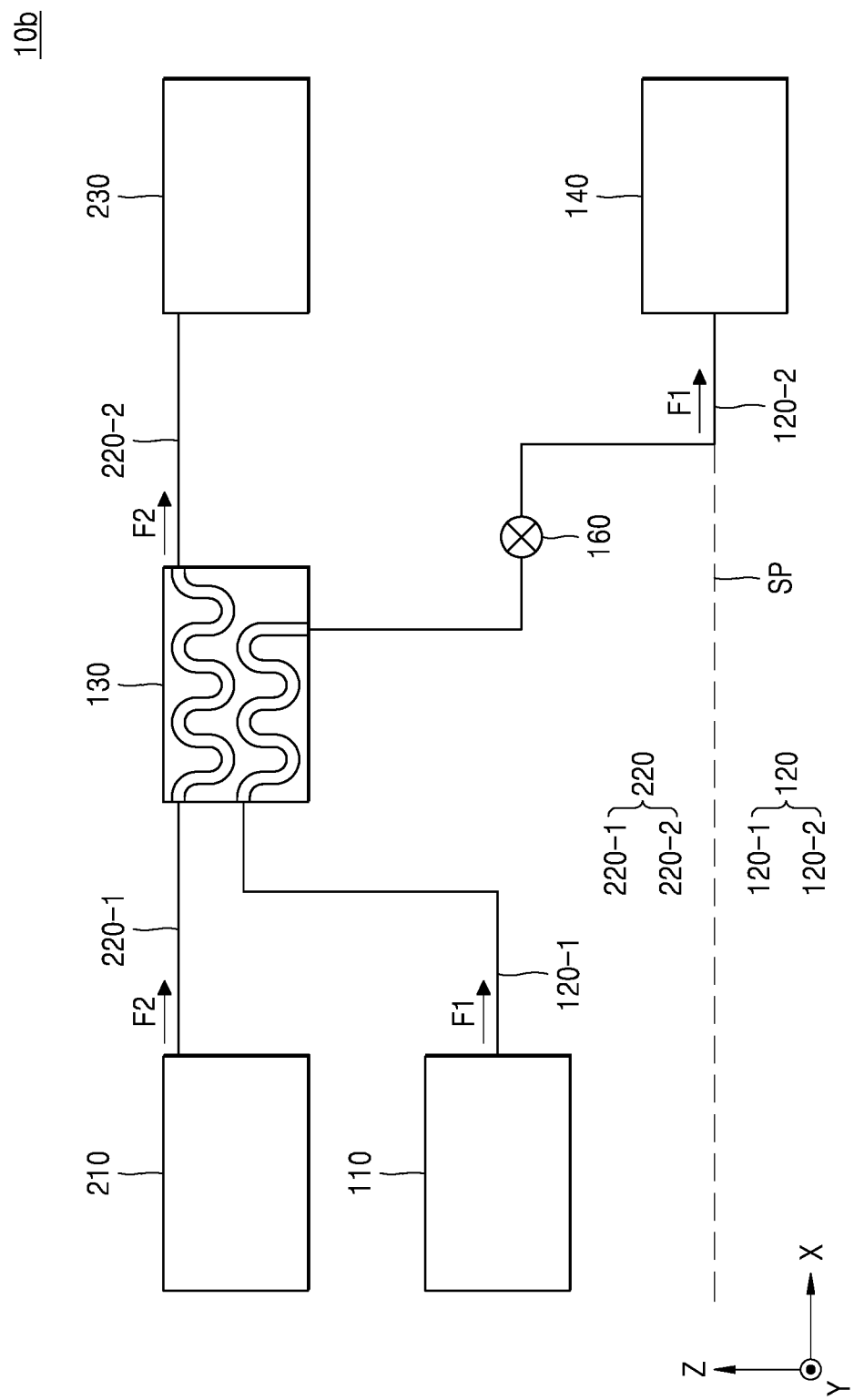
FIG. 3 is a diagram illustrating a configuration of a fluid supply system according to an embodiment of the inventive concept.

FIG. 3 is a diagram illustrating a configuration of a fluid supply system according to an embodiment of the inventive concept.

Referring to FIG. 3, a fluid supply system 10b may include the first fluid source 110, the first transfer pipe 120, the heat exchanger 130, the first fluid recovery tank 140, a second trap 160, the second fluid source 210, the second transfer pipe 220, and the second fluid recovery tank 230. The first fluid source 110, the first transfer pipe 120, the heat exchanger 130, the first fluid recovery tank 140, the second fluid source 210, the second transfer pipe 220, and the second fluid recovery tank 230 of FIG. 3 may be substantially the same as the first fluid source 110, the first transfer pipe 120, the heat exchanger 130, the first fluid recovery tank 140, the second fluid source 210, the second transfer pipe 220, and the second fluid recovery tank 230 of FIG. 1A respectively. Therefore, the second trap 160 will be mainly described herein.

The second trap 160 may be configured such that a liquefied first fluid is transferred to the first fluid recovery tank 140, and a vaporized first fluid is not transferred to the first fluid recovery tank 140. Accordingly, the liquefied first fluid may be recovered in the first fluid recovery tank 140. For example, the second trap 160 may include a free float trap. The second trap 160 may be disposed between the heat exchanger 130 and the first fluid recovery tank 140, and may be connected on the first discharge transfer pipe 120-2 such that the liquefied first fluid may be transferred from the heat exchanger 130 to the first fluid recovery tank 140 through the first discharge transfer pipe 120-2 and the second trap 160.

The second trap 160 may be disposed at a vertical level between a vertical level of the heat exchanger 130 and a vertical level of the first fluid recovery tank 140. Accordingly, the first fluid discharged from the heat exchanger 130 may move to the second trap 160 through gravity, and the first fluid that has passed through the second trap 160 may be transferred to the first fluid recovery tank 140.

Figure 4A:
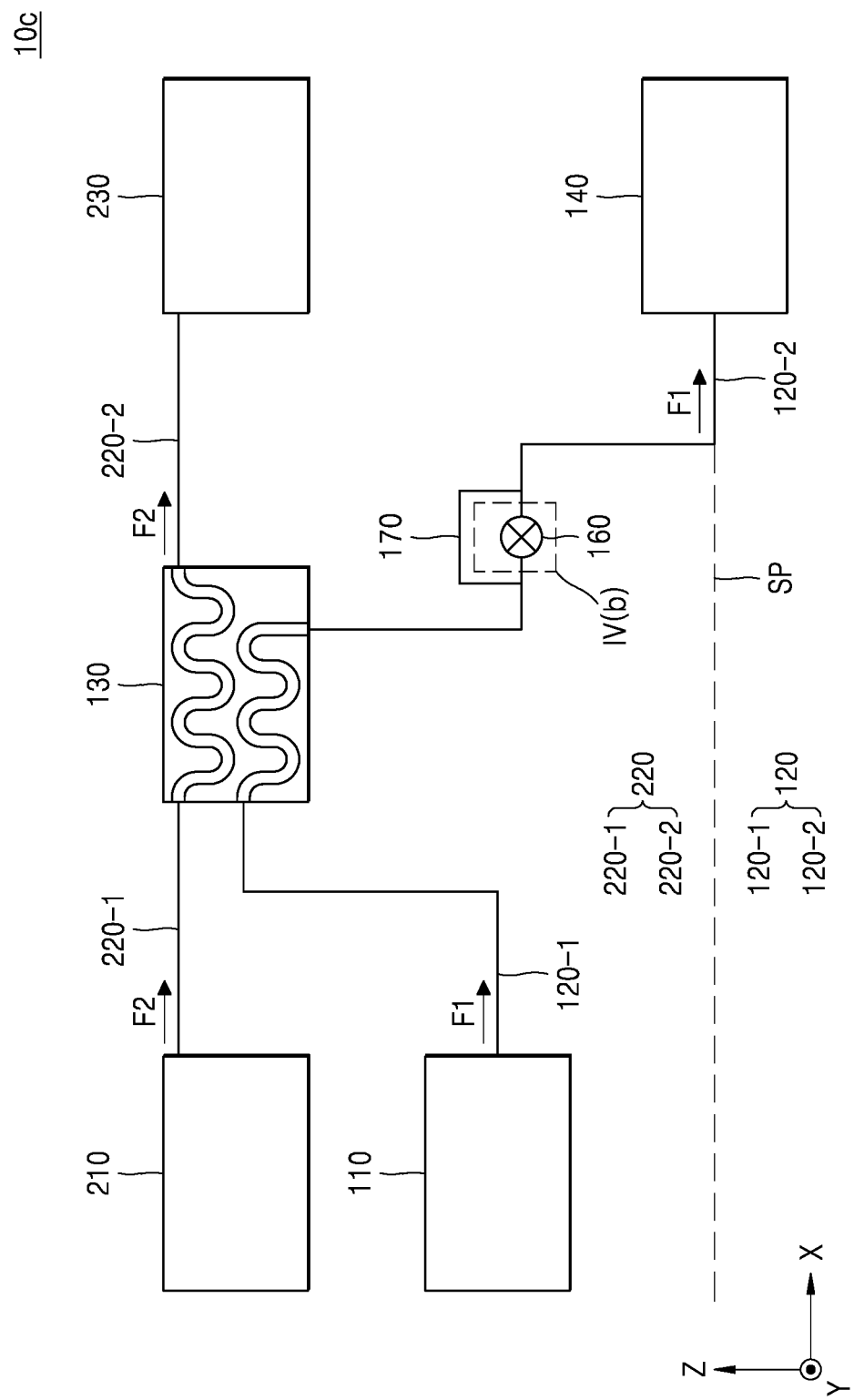
FIG. 4A is a diagram illustrating a configuration of a fluid supply system according to an embodiment of the inventive concept.
Figure 4B:
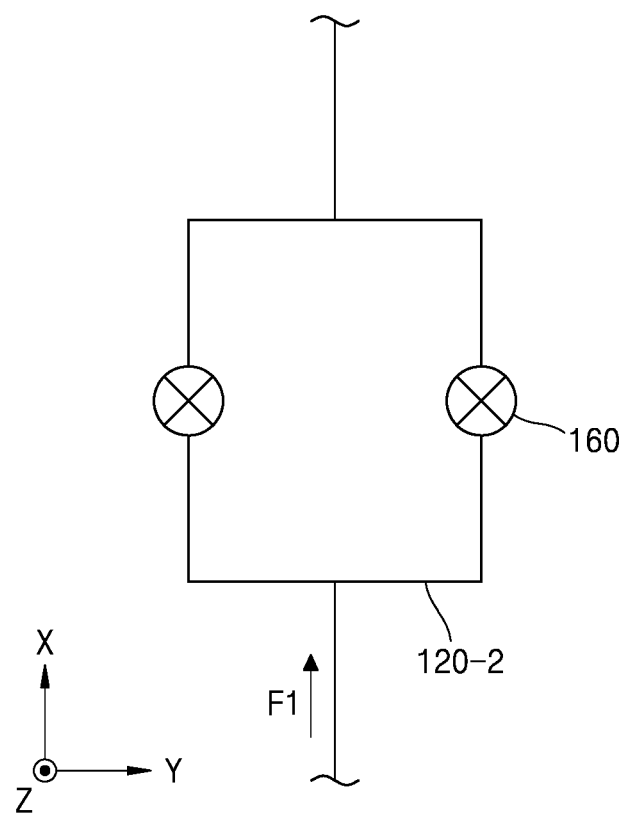
FIG. 4B is a diagram illustrating a second trap of FIG. 4A, viewed from a vertical direction.

FIG. 4A is a diagram illustrating a configuration of a fluid supply system according to an embodiment of the inventive concept, and FIG. 4B is a diagram illustrating a second trap of FIG. 4A, viewed from a vertical direction.

Referring to FIG. 4A, a fluid supply system 10c may include the first fluid source 110, the first transfer pipe 120, the heat exchanger 130, the first fluid recovery tank 140, a second trap 160, a bypass pipe 170, the second fluid source 210, the second transfer pipe 220, and the second fluid recovery tank 230. The first fluid source 110, the first transfer pipe 120, the heat exchanger 130, the first fluid recovery tank 140, the second trap 160, the second fluid source 210, the second transfer pipe 220, and the second fluid recovery tank 230 of FIG. 4A may be substantially the same as first fluid source 110, the first transfer pipe 120, the heat exchanger 130, the first fluid recovery tank 140, the second trap 160, the second fluid source 210, the second transfer pipe 220, and the second fluid recovery tank 230 of FIG. 1A, respectively. Therefore, the bypass pipe 170 will be mainly described herein.

The bypass pipe 170 may be configured such that a first fluid that has passed through the heat exchanger 130 is bypassed and transferred to the first fluid recovery tank 140. The first transfer pipe 120 may include a main pipe on which the second trap 160 is installed, and the bypass pipe 170. When the first fluid equal to or greater than a transfer flow rate of the first transfer pipe 120 on which the second trap 160 is disposed is transferred to the first transfer pipe 120, the bypass pipe 170 may transfer an overflowed first fluid to the first fluid recovery tank 140. The bypass pipe 170 may be disposed between the heat exchanger 130 and the first fluid recovery tank 140.

The bypass pipe 170 may be disposed between a vertical level of the heat exchanger 130 and a vertical level of the first fluid recovery tank 140. For example, the first fluid discharged from the heat exchanger 130 may move to the bypass pipe 170 through gravity, and the first fluid that has passed through the bypass pipe 170 may move to the first fluid recovery tank 140. In addition, the bypass pipe 170 may be at a higher vertical level than that of the second trap 160. Accordingly, when the second trap 160 does not handle the flow rate of the first fluid, the first fluid may flow in the bypass pipe 170. If the bypass pipe 170 is at a lower vertical level than that of the second trap 160, the first fluid may be preferentially transferred to the bypass pipe 170. When the second trap 160 and the bypass pipe 170 are installed, the first discharge transfer pipe 120-2 on which no bypass pipe is disposed may be referred to as a main pipe. For example, the liquefied first fluid may be transferred from the heat exchanger 130 to the first fluid recovery tank 140 through the first discharge transfer pipe 120-2, the second trap 160, and the bypass pipe 170.

Also, the fluid supply system 10c may include a plurality of second traps 160. For example, the first transfer pipe 120 on which the second trap 160 is disposed may be branched into a plurality of pipes. The plurality of first transfer pipes 120 on which the second traps 160 are disposed may be substantially at the same vertical level and may be branched in parallel.

Figure 5:
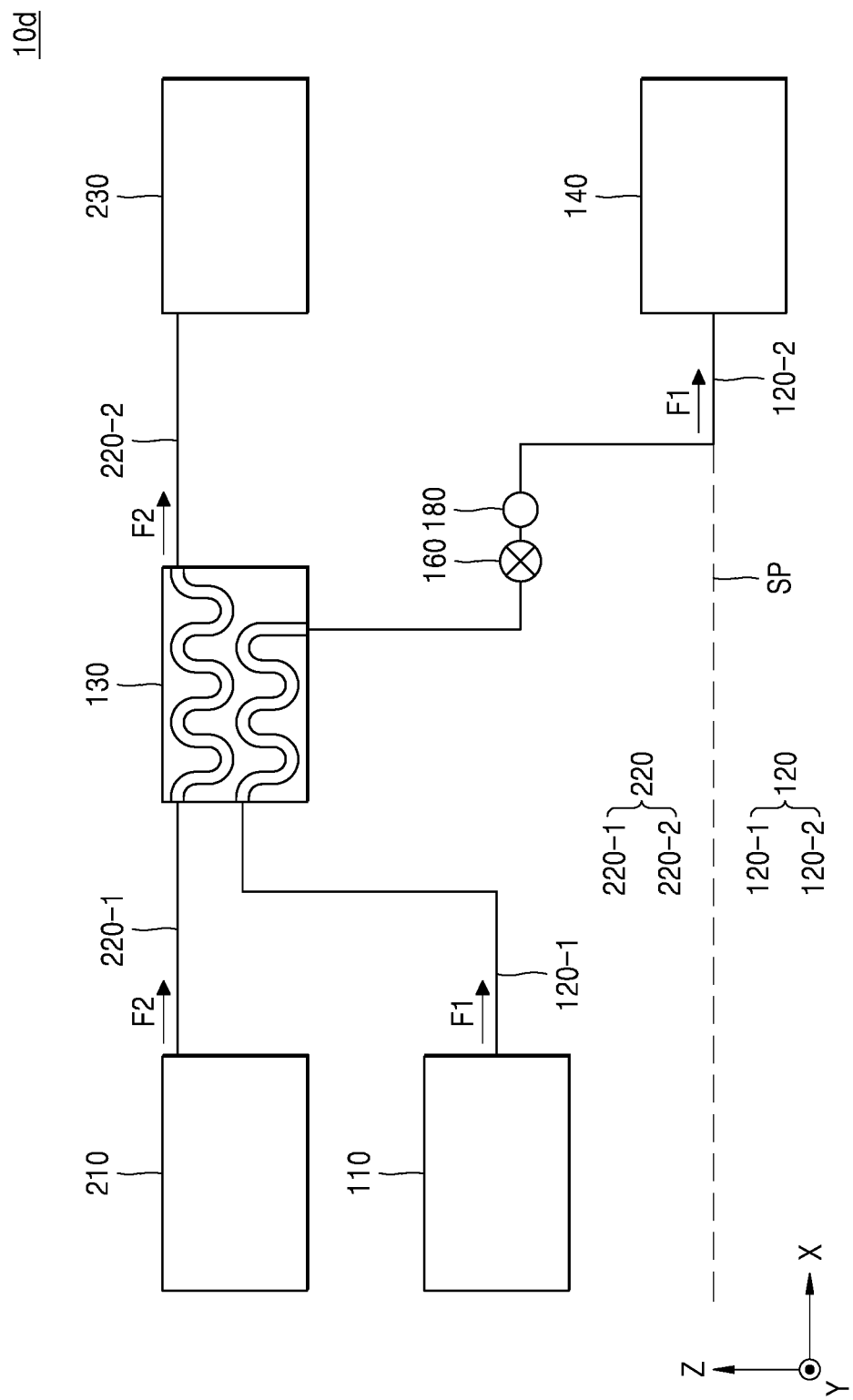
FIG. 5 is a diagram illustrating a configuration of a fluid supply system according to an embodiment of the inventive concept.

FIG. 5 is a diagram illustrating a configuration of a fluid supply system according to an embodiment of the inventive concept.

Referring to FIG. 5, a fluid supply system 10d may include the first fluid source 110, the first transfer pipe 120, the heat exchanger 130, the first fluid recovery tank 140, the second trap 160, the bypass pipe 170, a flow rate sensor 180, the second fluid source 210, the second transfer pipe 220, and the second fluid recovery tank 230. The first fluid source 110, the first transfer pipe 120, the heat exchanger 130, the first fluid recovery tank 140, the second trap 160, the second fluid source 210, the second transfer pipe 220, and the second fluid recovery tank 230 of FIG. 5 may be substantially the same as first fluid source 110, the first transfer pipe 120, the heat exchanger 130, the first fluid recovery tank 140, the second trap 160, the second fluid source 210, the second transfer pipe 220, and the second fluid recovery tank 230 of FIG. 4A, respectively. Therefore, the flow rate sensor 180 will be mainly described herein.

The flow rate sensor 180 may measure the flow rate of a first fluid to sense whether operations of the first transfer pipe 120 and the second trap 160 are abnormal. The flow rate sensor 180 may be disposed between the second trap 160 and the first fluid recovery tank 140 such that the first fluid may be transferred from the heat exchanger 130 to the first fluid recovery tank 140 through the first discharge transfer pipe 120-2, the second trap 160, and the flow rate sensor 180. For example, the flow rate sensor 180 may be disposed at the same vertical level as that of the second trap 160. Accordingly, it may be easily determined whether the operation of the component of the fluid supply system 10d is abnormal.

According to an embodiment of the inventive concept, when the flow rate in the first transfer pipe 120 is not included in a predetermined range of the flow rate, the first transfer pipe 120 and/or the second trap 160 may be determined to be defective.

When the first transfer pipe 120 is at the same vertical level and branched into a plurality of pipes, and the second trap 160 is disposed on each first transfer pipe 120, the flow rate sensor 180 may be disposed between the second trap 160 and the first fluid recovery tank 140. Whether the operation of the second trap 160 is abnormal may be determined using the flow rate sensor 180. The second trap 160 and the flow rate sensor 180 may be disposed at the same vertical level.

Although not shown in FIG. 5, when the bypass pipe (170 of FIG. 4A) is disposed, the flow rate sensor 180 may be disposed on the bypass pipe (170 of FIG. 4A). Accordingly, the flow rate sensor 180 may be disposed at the same vertical level as that of the bypass pipe (170 of FIG. 4A).

Figure 6:
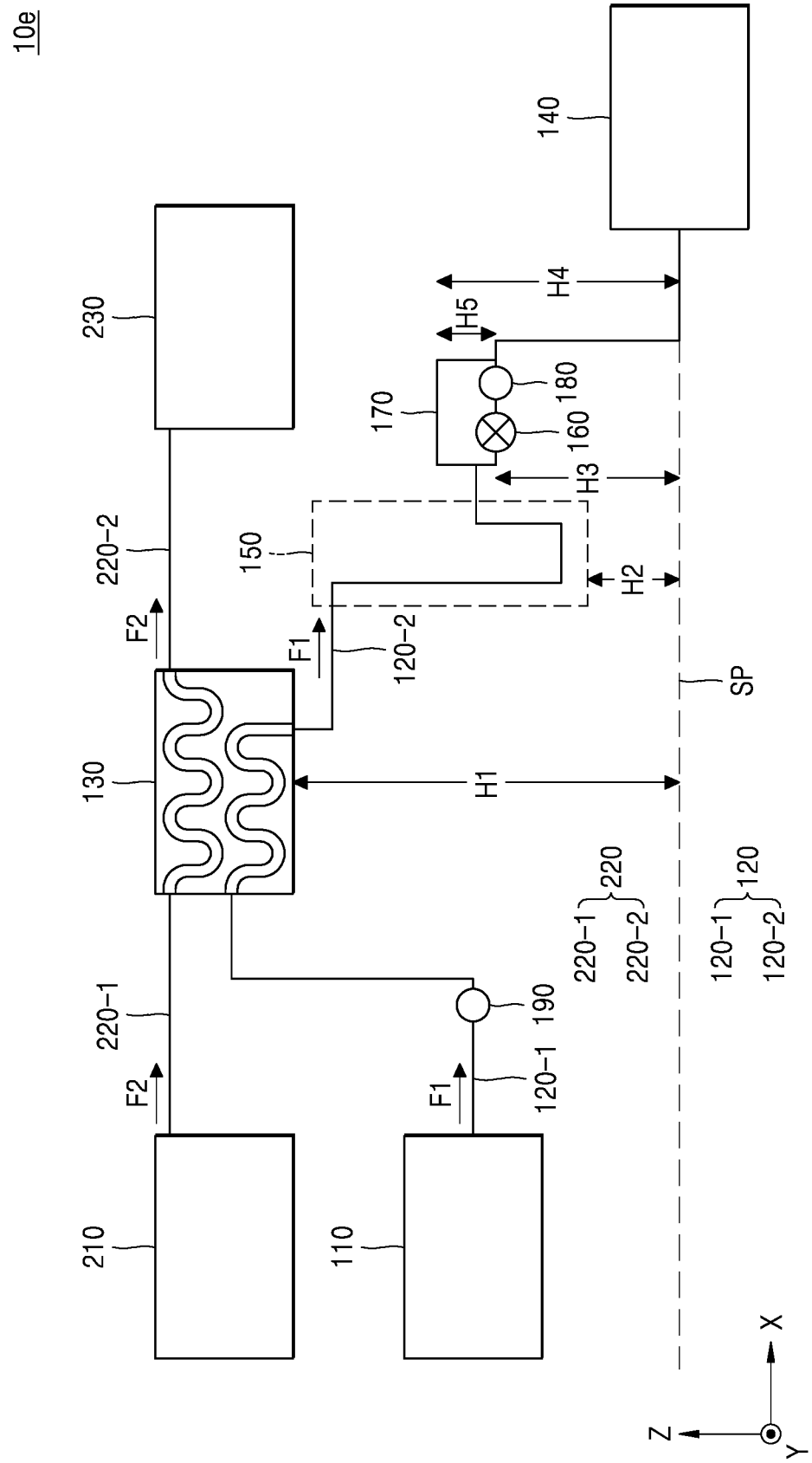
FIG. 6 is a diagram illustrating a configuration of a fluid supply system according to an embodiment of the inventive concept.

FIG. 6 is a diagram illustrating a configuration of a fluid supply system according to an embodiment of the inventive concept.

Referring to FIG. 6, a fluid supply system 10e may include the first fluid source 110, the first transfer pipe 120, the heat exchanger 130, the first fluid recovery tank 140, the first trap 150, the second trap 160, the bypass pipe 170, the flow rate sensor 180, a pressure regulator 190, the second fluid source 210, the second transfer pipe 220, and the second fluid recovery tank 230.

The first fluid source 110 may further include the pressure regulator 190. The pressure regulator 190 may adjust the pressure of a vaporized first fluid. Accordingly, the first fluid may be transferred to the heat exchanger 130 at an appropriate pressure. For example, the first fluid may be supplied to the heat exchanger 130 at a pressure of about 1 kgf/cm$^2$ to about 3 kgf/cm$^2$. The pressure regulator 190 may include, for example, a pump. According to an embodiment of the inventive concept, the pressure regulator 190 may be disposed on the first insertion transfer pipe 120-1.

The first fluid may be transferred from the first fluid source 110 to the first trap 150 through the heat exchanger 130. The first fluid that has passed through the first trap 150 may be transferred to the second trap 160 and/or may be transferred to the bypass pipe 170. Thereafter, the first fluid may move to the first fluid recovery tank 140. Accordingly, the first trap 150 may be disposed between the heat exchanger 130 and the second trap 160.

For example, the heat exchanger 130 is at a higher vertical level than those of the first fluid recovery tank 140, the first trap 150, the second trap 160, the bypass pipe 170, and the flow rate sensor 180. Accordingly, the first fluid that has passed through the heat exchanger 130 may pass through the first trap 150, the second trap 160, the bypass pipe 170, and/or the flow rate sensor 180 and move to the first fluid recovery tank 140.

In addition, the bypass pipe 170 may be at a higher vertical level than that of the second trap 160. In addition, the second trap 160 and the bypass pipe 170 may be at a higher vertical level than that of the first fluid recovery tank 140. Accordingly, the first fluid that has passed through the second trap 160 and/or the bypass pipe 170 may move to the first fluid recovery tank 140.

When the bypass pipe 170 is at a lower vertical level than that of the second trap 160, the flow rate of the first fluid flowing through the bypass pipe 170 may be greater than the flow rate of the first fluid flowing through the second trap 160. Accordingly, the bypass pipe 170 may be at a higher vertical level than that of the second trap 160.

In example embodiments, among the heat exchanger 130, the first fluid recovery tank 140, the first trap 150, the second trap 160, the bypass pipe 170, and the flow rate sensor 180, the heat exchanger 130 may be at the highest vertical level, and the first fluid recovery tank 140 may be at the lowest vertical level.

As described above, according to an embodiment of the inventive concept, a difference H1 between the vertical level of the heat exchanger 130 and the vertical level of the first fluid recovery tank 140 may be about 0.5 m to about 5 m.

Also, a difference H2 between a vertical level of the third part of the first trap 150 and the vertical level of the first fluid recovery tank 140 may be about 0.05 m to about 0.5 m. A difference H3 between the vertical level of the second trap 160 and the vertical level of the first fluid recovery tank 140 may be about 0.1 m to about 2 m. A difference H4 between the vertical level of the bypass pipe 170 and the vertical level of the first fluid recovery tank 140 may be about 0.1 m to about 3 m. Also, a difference H5 between the vertical level of the second trap 160 and the vertical level of the bypass pipe 170 may be about 0.1 m to about 1 m.

While the inventive concept has been particularly shown and described with reference to embodiments thereof, it will be understood that various changes in form and details may be made therein without departing from the spirit and scope of the following claims.

What is claimed is:

1. A fluid supply system comprising:
a first fluid source configured to supply a first fluid;
a second fluid source configured to supply a second fluid;
a heat exchanger including a first fluid moving tube through which the first fluid moves and a second fluid moving tube through which the second fluid moves, and configured to heat the second fluid and exchange heat between the first fluid and the second fluid;
a first fluid recovery tank operably connected to the first fluid moving tube of the heat exchanger to recover the first fluid that has passed through the fluid moving tube of the heat exchanger; and
a first transfer pipe configured to transfer the first fluid from the first fluid source to the first fluid recovery tank via the heat exchanger,
wherein the first fluid moving tube includes a first fluid inlet through which the first fluid is injected and a first fluid outlet through which the first fluid is discharged,
wherein the first fluid inlet is disposed at a first height level, and
wherein the first fluid outlet is disposed at a second height level lower than the first height level in the direction of gravity.

2. The fluid supply system of claim 1, further comprising:
a trap disposed between the heat exchanger and the first fluid recovery tank and comprising a first part of the first transfer pipe extending downward in the direction of gravity, a second part of the first transfer pipe extending in a direction perpendicular to the direction of gravity, and a third part of the first transfer pipe extending upward in a direction opposite to the direction of gravity,
wherein the first to third parts of the first transfer pipe are sequentially connected to each other,
wherein the first transfer pipe includes a first insertion transfer pipe disposed between the first fluid source and the heat exchanger, and a first discharge transfer pipe disposed between the heat exchanger and the first fluid recovery tank, and
wherein the first discharge transfer pipe and the trap are configured to transfer the first fluid from the heat exchanger to the first fluid recovery tank.

3. The fluid supply system of claim 2, wherein the trap is disposed between the heat exchanger and the first fluid recovery tank.

4. The fluid supply system of claim 1, further comprising:
a trap disposed between the heat exchanger and the first fluid recovery tank and configured to block the first fluid in a gaseous state.

5. The fluid supply system of claim 4, wherein the trap is disposed between the heat exchanger and the first fluid recovery tank.

6. The fluid supply system of claim 1, wherein:
the first fluid moving tube has a zigzag shape or a spiral shape.

7. A fluid supply system comprising:
a first fluid source configured to supply a first fluid;
a second fluid source configured to supply a second fluid;
a heat exchanger configured to heat the second fluid, and exchange heat between the first fluid and the second fluid;
a first fluid recovery tank configured to recover the first fluid that has passed through the heat exchanger;
a first transfer pipe configured to transfer the first fluid from the first fluid source to the first fluid recovery tank via the heat exchanger;
a first trap disposed between the heat exchanger and the first fluid recovery tank and comprising a first part of the first transfer pipe extending downward in the direction of gravity, a second part of the first transfer pipe extending in a direction perpendicular to the direction of gravity, and a third part of the first transfer pipe extending upward in a direction opposite to the direction of gravity; and
a second trap disposed between the heat exchanger and the first fluid recovery tank and configured to transfer the first fluid in a liquid state,
wherein the heat exchanger is disposed at a level higher than the level of the first fluid recovery tank in the direction of gravity,
wherein the first to third parts of the first transfer pipe are sequentially connected to each other,
wherein the first transfer pipe includes a first insertion transfer pipe disposed between the first fluid source and the heat exchanger, and a first discharge transfer pipe disposed between the heat exchanger and the first fluid recovery tank, and
wherein the first discharge transfer pipe and the first and second traps are configured to transfer the first fluid from the heat exchanger to the first fluid recovery tank.

8. The fluid supply system of claim 7, wherein the second trap is disposed between the first trap and the first fluid recovery tank.

9. The fluid supply system of claim 7, further comprising:
a bypass pipe disposed at a level higher than the level of a main pipe on which the second trap is disposed in the direction of gravity and the bypass pipe configured to pass the first fluid from the first trap to the first fluid recovery tank.

10. The fluid supply system of claim 9, wherein the bypass pipe is disposed between the heat exchanger and the first fluid recovery tank.

11. The fluid supply system of claim 7, further comprising:
a flow rate sensor disposed on the first transfer pipe and configured to measure a flow rate of the first fluid.

12. The fluid supply system of claim 11, wherein the flow rate sensor is disposed between the second trap and the first fluid recovery tank.

13. The fluid supply system of claim 7, wherein:
the first transfer pipe is branched in parallel into a plurality of pipes, and
the second trap is disposed on each of the plurality of branched pipes.

14. A fluid supply system comprising:
a first fluid source configured to supply a first fluid;
a second fluid source configured to supply a second fluid;
a heat exchanger configured to heat the second fluid, and exchange heat between the first fluid and the second fluid;
a first fluid recovery tank configured to recover the first fluid that has passed through the heat exchanger;
a second fluid recovery tank configured to recover the second fluid that has passed through the heat exchanger;
a first transfer pipe configured to transfer the first fluid from the first fluid source to the first fluid recovery tank via the heat exchanger;
a second transfer pipe configured to transfer the second fluid from the second fluid source to the second fluid recovery tank via the heat exchanger;
a first trap disposed between the heat exchanger and the first fluid recovery tank and comprising a first part of the first transfer pipe extending downward in the direction of gravity, a second part of the first transfer pipe extending in a direction perpendicular to the direction of gravity, and a third part of the first transfer pipe extending upward in a direction opposite to the direction of gravity;
a second trap disposed between the first trap and the first fluid recovery tank and configured to transfer the first fluid in a liquid state; and
a bypass pipe disposed between the first trap and the first fluid recovery tank, and configured to transfer the first fluid from the first trap to the first fluid recovery tank,
wherein the heat exchanger is disposed at a level higher than the level of the first fluid recovery tank in the direction of gravity,
wherein the first to third parts of the first transfer pipe are sequentially connected to each other,
wherein the first transfer pipe includes a first insertion transfer pipe disposed between the first fluid source and the heat exchanger, and a first discharge transfer pipe disposed between the heat exchanger and the first fluid recovery tank, and
wherein the first discharge transfer pipe and the first and second traps are configured to transfer the first fluid from the heat exchanger to the first fluid recovery tank.

15. The fluid supply system of claim 14, wherein the first fluid is supplied to the heat exchanger in a vapor state.

16. The fluid supply system of claim 14, further comprising:
a pressure regulator disposed between the first fluid source and the heat exchanger and configured to regulate a pressure of the first fluid.

17. The fluid supply system of claim 14, wherein the range of the difference in a distance between the level of the heat exchanger and the level of the first fluid recovery tank in the direction of gravity is about 0.5 m to about 5 m.

18. The fluid supply system of claim 14, wherein the range of the difference in a distance between the level of the second trap and the level of the first fluid recovery tank in the direction of gravity is about 0.1 m to about 2 m.

19. The fluid supply system of claim 14, wherein:
the first fluid comprises distilled water, and
the second fluid comprises at least one of deionized water and ultrapure water.

* * * * *